United States Patent [19]

Park

[11] Patent Number: 5,666,462

[45] Date of Patent: Sep. 9, 1997

[54] MULTI-PLAYER VIDEO SONG ACCOMPANIMENT APPARATUS

[75] Inventor: Byoung-yup Park, Suwon, Rep. of Korea

[73] Assignee: Samsung Electronics Co., Ltd., Kyungki-do, Rep. of Korea

[21] Appl. No.: 644,483

[22] Filed: May 10, 1996

[30] Foreign Application Priority Data

Aug. 21, 1995 [KR] Rep. of Korea ............... 95-25687

[51] Int. Cl.$^6$ ............... H04N 5/781; H04N 5/85; H04N 5/90; H04N 5/91
[52] U.S. Cl. ............... 386/125; 386/126; 369/75.1
[58] Field of Search ............... 360/91, 92; 369/75.1, 369/75.02, 77.02; 386/105, 106, 125, 126

[56] References Cited

U.S. PATENT DOCUMENTS

| 5,043,963 | 8/1991 | Iwamoto | 369/75.2 |
|---|---|---|---|
| 5,157,648 | 10/1992 | Okamoto et al. | 369/75.2 |
| 5,247,126 | 9/1993 | Okamura et al. | 84/609 |
| 5,257,111 | 10/1993 | Kakuyama | 386/125 |
| 5,260,801 | 11/1993 | Temma et al. | 358/335 |
| 5,420,690 | 5/1995 | Koishi | 386/126 |
| 5,448,373 | 9/1995 | Kim | 386/125 |

*Primary Examiner*—Thai Tran
*Assistant Examiner*—Vincent F. Boccio
*Attorney, Agent, or Firm*—Sughrue, Mion, Zinn, Macpeak & Seas

[57] ABSTRACT

A multi-player video song accompaniment apparatus has a moving picture disc turntable for loading a video compact disc which has stored thereon moving picture information. Two or more CD-OK turntables are arranged adjacent to and radially about the moving picture disc turntable, and each is operative to load a CD-OK disc storing accompaniment, text, and sub-title. A corresponding number of pickups as there are CD-OK turntables are provided for reading information recorded on the video compact disc and CD-OK disc, and a corresponding number of guardrails as there are CD-OK turntables are provided for guiding the pickups to reciprocate between the video compact disc and CD-OK disc. This apparatus provides the effect of multiple video song accompaniment apparatuses operating concurrently.

8 Claims, 4 Drawing Sheets

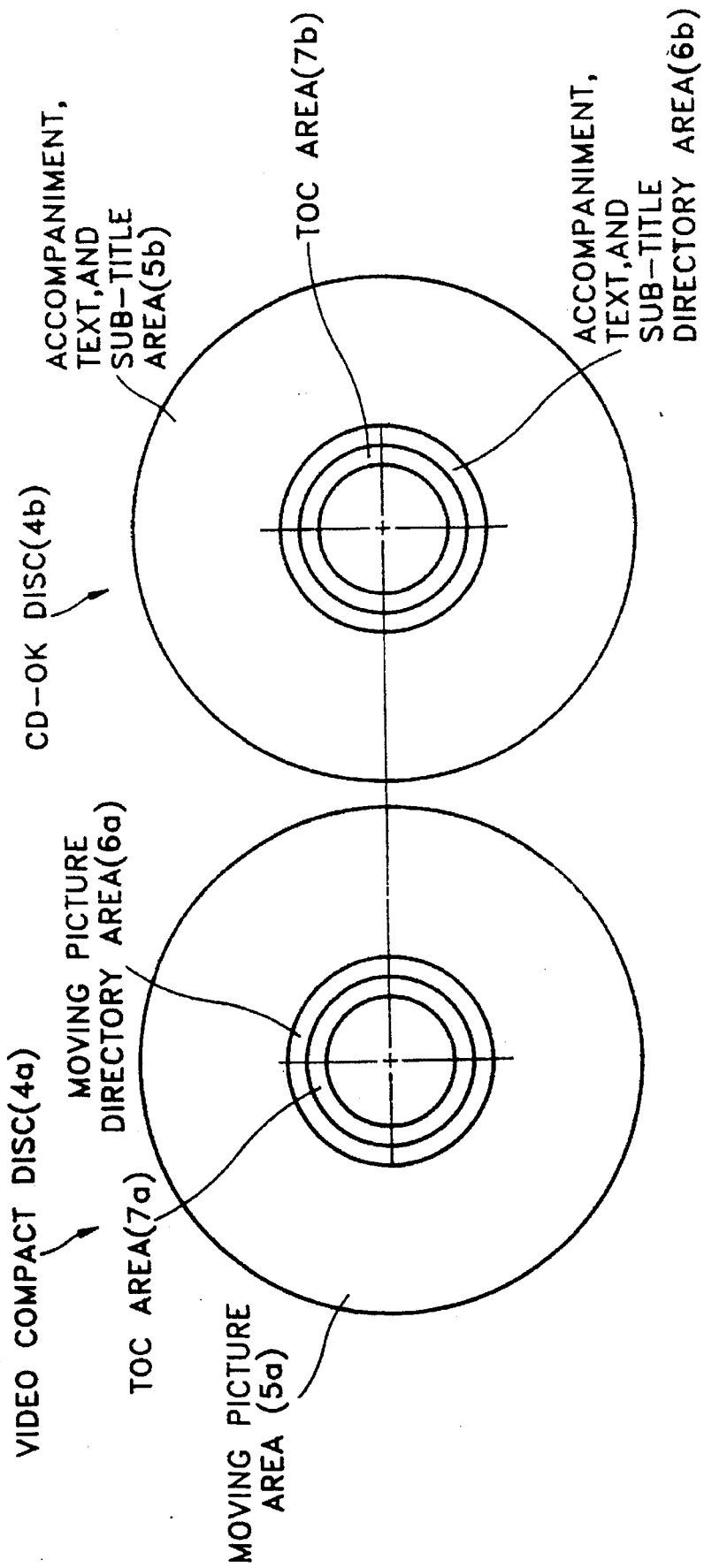

MULTI-PLAYER VIDEO SONG ACCOMPANIMENT APPARATUS

BACKGROUND OF THE INVENTION

The present invention relates in general to a video song accompaniment apparatus. More particularly, the invention is directed to a multi-player video song accompaniment apparatus having the effect of multiple video song accompaniment apparatus operating concurrently.

A video song accompaniment apparatus, sometimes referred to as "CD-OK," is used in karaoke houses (i.e., commercial singing rooms) or the like, in which one apparatus is individually installed in each room. In the case of a conventional video song accompaniment apparatus, since one apparatus is required for each room of the karaoke house, installation of such multiple apparatus can and will be quite expensive. This presents one problem of the conventional apparatus.

As is generally known, each video song accompaniment apparatus uses one disk unit. As shown in FIG. 1, the disc for a CD-OK includes a table of contents (TOC) area 1 for indexing information recorded on the disc, a video directory area 2a, an accompaniment, text, and sub-title directory area 2b, a video area 3a, and an accompaniment, text, and sub-title area 3b. When the video song accompaniment apparatus plays a disc, the apparatus reproduces still images along with the accompaniment, text, and sub-title.

The recording area of a conventional CD-OK disc is substantially divided into two portions, an area for video information and one for the accompaniment, text, and sub-title information, with each disc containing about 2000–3000 songs.

SUMMARY OF THE INVENTION

To solve the above and other problems, it is an object of the present invention to provide a multi-player video song accompaniment apparatus which can provide moving pictures along with the accompaniment, text, and sub-title information, thereby having the effect of multiple video song accompaniment apparatus operating concurrently using just one apparatus.

Accordingly, to achieve the above object, there is provided a multi-player video song accompaniment apparatus including a turntable for loading a video compact disc, which stores moving picture information, two or more CD-OK turntables arranged adjacent to and radially about the moving picture disc turntable, each operative to load a CD-OK disc that stores accompaniment, text, and sub-title information, a corresponding number of pickups for each CD-OK turntable for reading information recorded on the video compact disc and CD-OK discs, and a corresponding number of guardrails for each CD-OK turntable for guiding the pickups to reciprocate between the video compact disc and CD-OK discs.

Thus, according to the present invention, an apparatus is provided which is capable of showing moving pictures and has the effect of multiple video song accompaniment apparatus operating concurrently.

BRIEF DESCRIPTION OF THE DRAWINGS

The above objects and advantages of the present invention will become more apparent by describing in detail a preferred embodiment thereof with reference to the attached drawings in which:

FIG. 4 illustrates overhead views of discs showing recording areas of a video compact disc and a CD-OK disc used in the present invention, respectively.

DETAILED DESCRIPTION OF THE INVENTION

Figure 1:
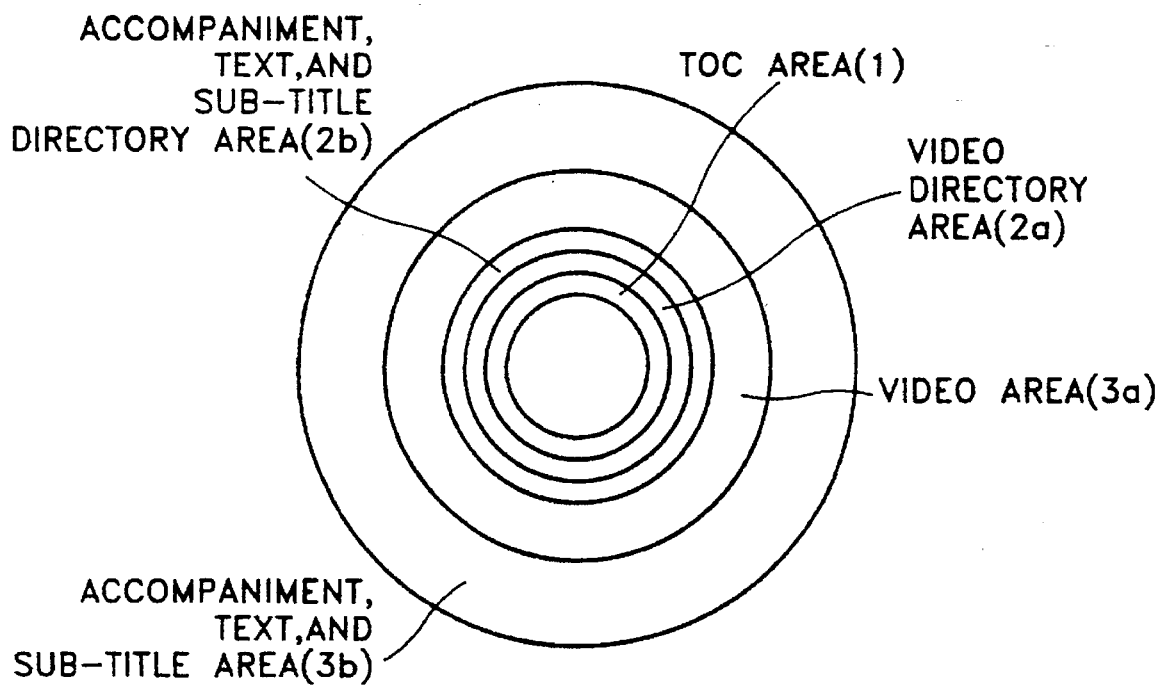
FIG. 1 illustrates an overhead view of a disc for a conventional video song accompaniment apparatus and the areas for recording signals.
Figure 2:
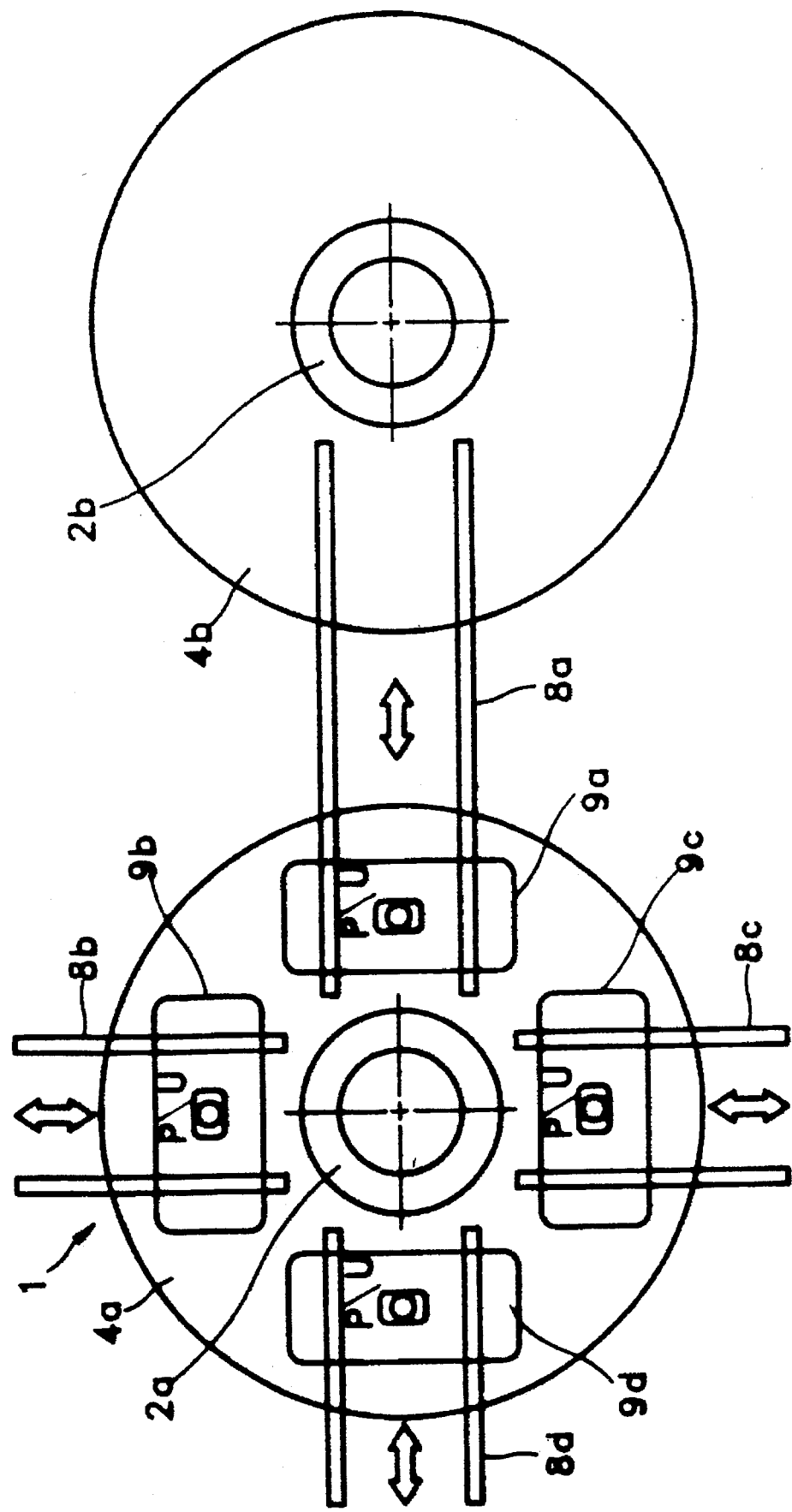
FIG. 2 illustrates an overhead view of an apparatus in accordance with the present invention.

FIG. 2 illustrates the structure of a multi-player video song accompaniment apparatus according to the present invention. Reference numeral 2a denotes a moving picture disc turntable, reference numeral 2b denotes a CD-OK turntable, reference numerals 4a and 4b denote a video compact disc and a CD-OK disc, respectively, reference numerals 9a, 9b, 9c, and 9d denote pickups for the respective CD-OK turntables (other CD-OK turntables not shown), and reference numerals 8a, 8b, 8c, and 8d denote guardrails, for the respective pickups.

Pickup 9a, driven by a pickup driving motor (not shown), moves between the two discs 4a and 4b along the guardrail 8a, and reads moving picture information from the video compact disc 4a and accompaniment, text, and sub-title information from the corresponding CD-OK disc 4b. Similarly, the other pickups 9b, 9c and 9d perform the same function as pickup 9a relative to a plurality of CD-OK turntables arranged adjacent to and radially about the moving picture turntable 2a. For each of these plurality of CD-OK turntables, there is a corresponding number of pickups and guardrails.

Figure 3:
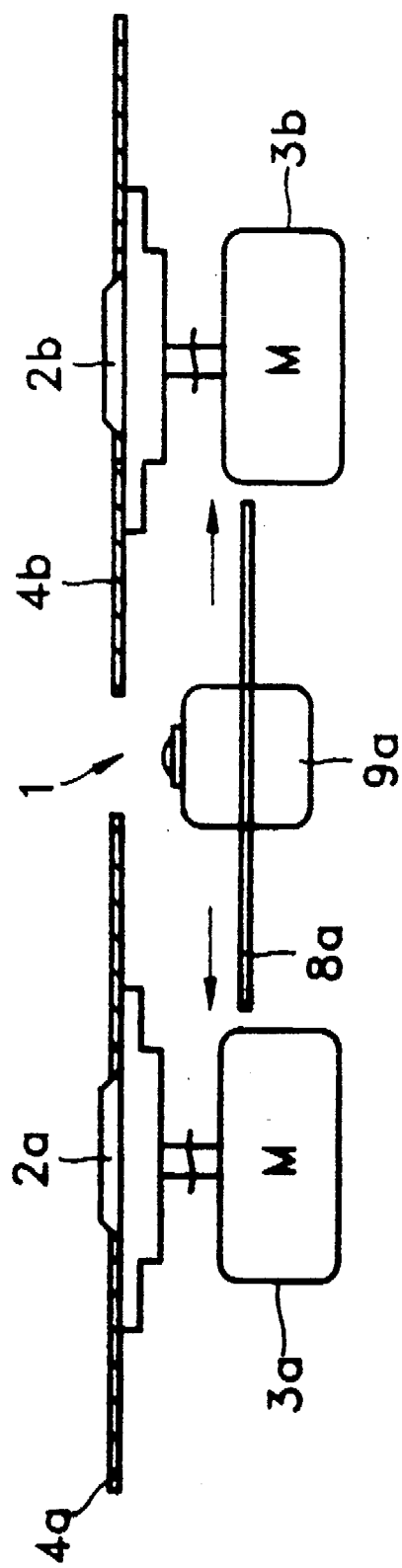
FIG. 3 shows a side view of the apparatus of FIG. 2.

FIG. 3 shows a side view of the structure of the multi-player video song accompaniment apparatus according to the present invention. In FIG. 3, reference numerals 3a and 3b denote spindle motors for rotating turntables 2a and 2b, respectively. The reference numerals in FIG. 3 which are the same as those in FIG. 2 denote the same components or portions of a disc.

FIG. 4 illustrates the video compact disc 4a that is loaded in the moving picture turntable, and the CD-OK disc 4b that is loaded in the CD-OK turntable. The video compact disc 4a includes a moving picture area 5a, a moving picture directory area 6a for recording directory information for the moving picture, and a TOC area 7a for indexing information recorded on the disc. The CD-OK disc 4b includes an accompaniment, text, and sub-title area 5b, an accompaniment, text, and sub-title directory area 6b for recording address information for the same, and a TOC area 7b for indexing information recorded on the disc.

Referring to FIGS. 2 through 4, the operation of the multi-player for a video song accompaniment apparatus according to the present invention will be described in detail.

First, after the video compact disc 4a and CD-OK disc 4b are loaded in turntables 2a and 2b, respectively, each disc, 4a and 4b, is rotated by spindle motors 2a and 2b. Then, if a user at a room selects a song, the selected moving picture information of the video compact disc 4a and the selected accompaniment, text, and sub-title information of CD-OK disc 4b are read out by the pickup 9a, which moves along the guardrail 8a. If users in more than one room select songs, the selected moving picture information of the video compact disc 4a and the selected accompaniment, text, and sub-title information of the CD-OK discs are read out by the pickups. The read out information is distributed through a controller (not shown) to each corresponding room of the karaoke house.

For example, assuming that the number of rooms is four, four CD-OK turntables would be arranged radially about the moving picture disc turntable and the same number of pickups and guardrails would be provided. The four pickups working separately, each moving along the corresponding guardrail between the two discs, read information recorded on both discs. When users at each room select songs, each user listens to the accompaniment of the selected song while viewing the moving picture, the corresponding text, and sub-title information that are displayed on a screen. Here, a digital video disc or any conventional video compact disc can replace the video compact disc shown in FIG. 4.

As described above, the multi-player video song accompaniment apparatus according to the present invention has the same effect as multiple video song accompaniment apparatus operating concurrently with the use of just one apparatus. Also, in the presently preferred multi-player, since the moving picture and accompaniment, text, and sub-title information are recorded separately on two discs instead of a single disc, moving pictures can be viewed instead of simply a still picture.

There has thus been shown and described a novel a multi-player video song accompaniment apparatus having the effect of multiple video song accompaniment apparatus operating concurrently, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A multi-player video song accompaniment apparatus comprising:

a moving picture disc turntable for loading a video compact disc having stored thereon moving picture information;

two or more CD-OK turntables, arranged adjacent to and radially about said moving picture disc turntable, each of said two or more CD-OK turntables loading a CD-OK disc having stored thereon accompaniment, text, and sub-title information;

a plurality of pickups, one for each of said CD-OK turntables for reading information recorded on said video compact disc and said CD-OK discs; and a plurality of guide-rails for each of said pickups, for guiding said pickups to reciprocate between said video compact disc and said CD-OK discs.

2. A multi-player video song accompaniment apparatus as defined by claim 1, wherein there are four CD-OK turntables, four pickups, and four sets of guide-rails.

3. A multi-player video song accompaniment apparatus as defined by claim 1, wherein said moving picture disc turntable is operative to reproduce the moving picture information stored on said video compact disc.

4. A multi-player video song accompaniment apparatus as defined by claim 1, wherein each of said two or more CD-OK turntables is operative to reproduce the accompaniment, text, and sub-title information.

5. A multi-player video song accompaniment apparatus as defined by claim 4, further comprising a display for displaying said accompaniment, text, and sub-title information reproduced by each of said CD-OK turntables.

6. A multi-player video song accompaniment apparatus comprising:

a moving picture disc turntable for loading a video compact disc having stored thereon moving picture information;

two or more CD-OK turntables, arranged adjacent to and radially about the perimeter of said moving picture disc turntable, each of said two or more CD-OK turntables loading a CD-OK disc having stored thereon accompaniment, text, and sub-title information;

reading means for reading information stored on said video compact disk and for reading information stored on each of said CD-OK discs; and guiding means for guiding said reproducing means between said moving picture disc turntable for reading information on said video compact disc and said two or more CD-OK turntables for reproducing information stored on each of said CD-OK discs.

7. A multi-player video song accompaniment apparatus as defined by claim 6, wherein said reading means comprises a pickup device for each of said CD-OK turntables.

8. A multi-player video song accompaniment apparatus as defined by claim 6, wherein said guiding means comprises a pair of guide-rails for each of said CD-OK turntables for guiding said reading means to and from said moving picture disc turntable and said CD-OK disc.

* * * * *